United States Patent [19]

Rieke et al.

[11] Patent Number: 5,309,890
[45] Date of Patent: May 10, 1994

[54] DUAL-SIDED CONDENSATE TRAP FOR FURNACE

[75] Inventors: Larry D. Rieke, Zionsville; Eric A. Harvey, Greenwood, both of Ind.

[73] Assignee: Carrier Corporation, Syracuse, N.Y.

[21] Appl. No.: 100,619

[22] Filed: Jul. 30, 1993

[51] Int. Cl.⁵ ............................................. F24H 3/02
[52] U.S. Cl. .................... 126/110 R; 126/116 R; 110/203; 137/247.27; 137/247.41; 165/913
[58] Field of Search ............. 126/110 R, 99 R, 116 R, 126/99 A, 109, 110 D, 117; 110/203, 216; 165/913; 137/247.27, 247.41, 314, 409; 122/17, 20 B

[56] References Cited

U.S. PATENT DOCUMENTS

| | | |
|---|---|---|
| 4,449,511 | 5/1984 | Hays et al. .................. 126/110 R |
| 4,515,145 | 5/1985 | Tallman et al. .............. 126/110 R |
| 4,542,734 | 9/1985 | Trent et al. ................. 126/110 R |
| 4,603,680 | 8/1986 | Dempsey et al. ............. 126/110 R |
| 4,682,579 | 7/1987 | Bigham ....................... 126/110 R |
| 4,724,328 | 3/1988 | Shellenberger .............. 126/110 R |
| 4,892,045 | 1/1990 | Schumacher ................. 110/203 |
| 4,899,726 | 2/1990 | Waterman .................... 126/110 R |

Primary Examiner—James C. Yeung

[57] ABSTRACT

There is disclosed a furnace having an air flow path for heated air and combustion products that passes through a condensing heat exchanger. Condensate forming in regions of negative and positive pressure is separately conducted to a unitary condensate trap of minimal vertical height incorporating therein separate traps for handling the high and low pressure gaseous environments. The condensate is drained through a common outlet port into the atmosphere or into a drain pipe.

9 Claims, 4 Drawing Sheets

DUAL-SIDED CONDENSATE TRAP FOR FURNACE

BACKGROUND OF THE INVENTION

1. Field of the Invention

This invention relates to a furnace for providing heated circulation air to an interior comfort space, and is more particularly directed to a condensate trap for a gas fired forced air furnace of the type having a heat exchanger.

2. Description of the Prior Art

In conventional gas-fired forced air furnaces a thermostat senses the temperature in the comfort zone relative to a predetermined set point temperature. When the temperature is below the set point, the thermostat closes to supply thermostat ac power to the furnace as a call for heat. This initiates a sequence of events that ultimately causes the furnace to come on. An inducer motor is enabled to flow combustion air across the burners, and through a condensing heat exchanger, after which a gas valve is actuated to supply gas to the gas burners. An ignition device is also actuated to light the burners. A flame sensor then proves burner ignition and sends power to a burner delay timer. Then after a predetermined blower delay time, which varies with furnace design, the furnace blower is actuated. The blower moves room air from a return air duct through the furnace heat exchanger to pick up heat from the heated combustion products (carbon dioxide and water vapor) from the gas burners. The heated circulate air then goes into a hot air plenum and is distributed through hot air ductwork back to the comfort space. When the comfort space air is warmed sufficient to reach the thermostat set point, the thermostat terminates the call for heat. When this happens the blower and burners go through a shut off sequence and the furnace awaits the next call for heat.

The present invention mainly deals with handling of large amounts of condensate that form in the condensing heat exchanger and also in the inducer housing. When the inducer motor is in operation a substantial step-up in pressure occurs between the condensing heat-exchanger and intake of the inducer housing on the one hand, and the outflow of the inducer housing on the other hand. Typically there is negative pressure (relative to atmospheric pressure) at the intake, and positive pressure at the outflow. In the prior art a trap 110, shown in FIG. 5, and having a single chamber has been used to simultaneously trap condensate forming in both pressure compartments. In this trap a first tube 112, in fluid communication with a source of high pressure, leads downward to terminate beneath the surface of a reservoir 117 of water. An overflow drain 115 is situated a distance A above the terminus of the tube. A second tube 114, connected to a source of negative pressure, also has a terminus beneath the surface of the reservoir. Condensate forming within the sources drips or flows through the tube 112, 114 into the reservoir 117. The overflow drain is located a distance B beneath the top of the chamber. In operation the water levels 116, 118 within the tubes 112, 114 are displaced toward and away from the termini of the tubes in accordance with the pressure heads in their respective sources. It is evident that the distance A is a measure of the amount of positive pressure that can be withstood by the trap before gases from the positive source are forced through the end of the tube to bubble into the chamber. Also distance B is a measure of the amount of negative pressure the trap can handle before the reservoir contents are sucked back into the negative source. Thus the sum A+B is a lower limit on the vertical dimension of this single-chambered trap.

Older furnaces typically create positive pressure of about 1½ inches (3.8 cm) of water, and negative pressure of about 2½ inches (6.3 cm) of water, so that the trap only had to be 4 inches (10.2 cm) tall. Modern high flow furnaces can produce about 4 inches (10.2 cm) of positive pressure and 4 inches (10.2 cm) of negative pressure, requiring the trap to be at least 8 inches (20.3 cm) tall.

Also, on older furnaces pressure differentials within the inducer housing due to rotation of the inducer wheel or fan impaired the drainage of condensate from the housing. Condensate would then build up in the housing and eventually hinder the inducer's ability to move flue gases through the furnace.

SUMMARY OF THE INVENTION

It is therefore a primary object of the present invention to provide a compact condensate trap that can simultaneously handle condensate from a source of negative pressure and a source of positive pressure.

It is another object of the present invention to provide a condensate trap suitable for modern gas fired furnaces that generate large internal positive and negative pressures.

It is yet another object of the present invention to provide a condensate trap with a relief port to assist a flow of condensate out of an inducer housing.

These and other objects of the present invention are attained by a furnace for supplying circulating heated air to an interior comfort space and having at least one burner, wherein an air flow of heated gas is moved by an inducer through a condensing heat exchanger and is exhausted therefrom through an exhaust vent to an outside environment. The furnace has a trap for condensate forming in the air flow, the condensate trap simultaneously receiving liquid condensate forming in first and second gaseous environments that are respectively under positive and negative pressure relative to a third gaseous environment. The trap comprises a container having first and second inlet ports through an upper portion thereof that respectively access the first and second gaseous environments, a first fluid reservoir in a bottom portion thereof, and an outlet port through a lower portion thereof for conducting overflow of the first fluid reservoir into a drain and into the third gaseous environment. The trap has a first duct extending from the first inlet port and terminating in the interior of the container below a surface of the first liquid reservoir to accommodate a first liquid reservoir that establishes a first liquid seal between the first gaseous environment and the third gaseous environment. There is a second duct extending from the second inlet port to an interior of the container having a recurved or reflexively directed segment which contains a second liquid reservoir, a portion of the second liquid reservoir being disposed above the outlet port to establish a second liquid seal between the second gaseous environment and the third gaseous environment. The trap has a small relief port near the second inlet port that connects the first and second gaseous environments to assist in drainage from the second gaseous environment.

According to one aspect of the invention the trap has a dimension C defined by a lower margin of the first inlet port and a lower end of the first duct, a dimension D defined by a lower margin of the second inlet port and a lower end of a partition in the recurved portion in the second duct, and a vertical height given by the formula $$H = M + K$$

wherein
H is the vertical height of the trap;
M is the greater of dimensions C and D; and
K is a constant.

According to another aspect of the invention the furnace has at least one gas-fired burner, and the air flow comprises combustion products thereof, and the output port is at atmospheric pressure.

BRIEF DESCRIPTION OF THE DRAWING

For a better understanding of these and other objects of the present invention, reference is made to the detailed description of the invention which is to be read in conjunction with the following drawings, wherein.

DESCRIPTION OF THE PREFERRED EMBODIMENT

Figure 1:
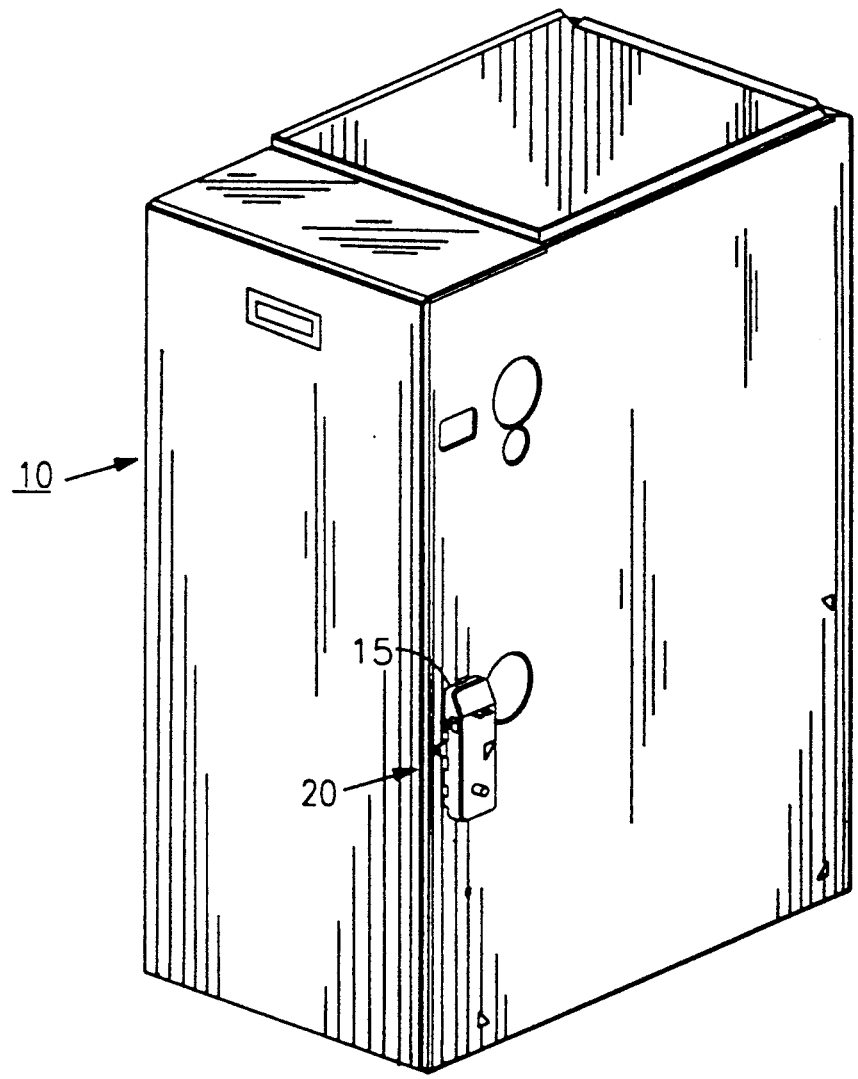
FIG. 1 is a perspective view of the cabinet of a gas-fired furnace having an externally attached condensate trap in accordance with the invention.
Figure 6:
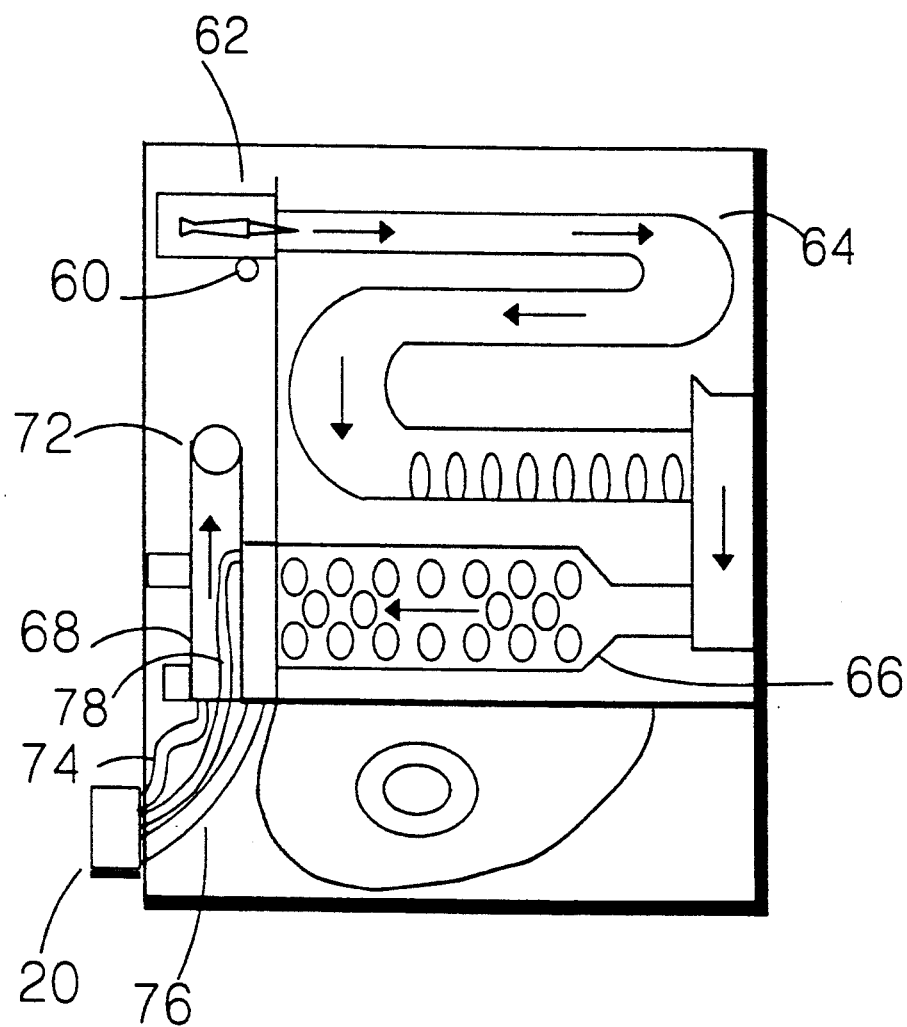
FIG. 6 is a partially schematic view of a gas-fired furnace suitable for use with the invention.

Turning now to FIG. 1 of the Drawing, there is shown a gas-fired furnace 10. Externally attached thereto is a condensate trap 20 in accordance with the invention. Access to gaseous environments in the interior of the furnace 10 is provided by access port 15. As shown in the diagrammatic view of FIG. 6. such furnaces are provided with a gas flow path extending from an air intake 60, in turn passing at least one gas-fired burner 62, through a primary heat exchanger 64, and a condensing heat exchanger 66. Inducer 68 draws gases along the flow path and exhausts them into the external environment via exhaust vent 72. When the inducer 68 is in operation the gas pressure in the portion of the flow path at the intake of the inducer 68 is negative with respect to atmospheric pressure, and a positive gas pressure is generated within the inducer 68 itself and in those regions intermediate the inducer 68 and the exhaust vent 72, as well as in a vent pipe attached to vent 72 (not shown). As a result of temperature changes in the condensing heat exchanger, condensate forms in the flow path proximate the intake of the inducer (known as the collector box), and within the inducer itself. Tubes 74, 76 extend from the area of the inducer intake and from the inducer to externally mounted condensate trap 20 to conduct condensate therethrough.

Tube 78, having a small diameter, extends from the intake of the inducer 68 to port 79 (see FIG. 3) of condensate trap 20. This small tube connects the negative and positive gaseous environments to provide a small amount of gas circulation from the inducer outlet, through tube 74 and port 34, chamber 54, port 79, and back to the inlet of the inducer (the collector box) via tube 78. The gas flow in this circulation is small enough that it does not equalize pressures. The recirculation of gas assists in carrying condensate from inducer 68 to trap 20 that otherwise would not drain due to pressure differentials in the inducer 68 created by the rotating inducer wheel or fan (not shown).

Figure 2:
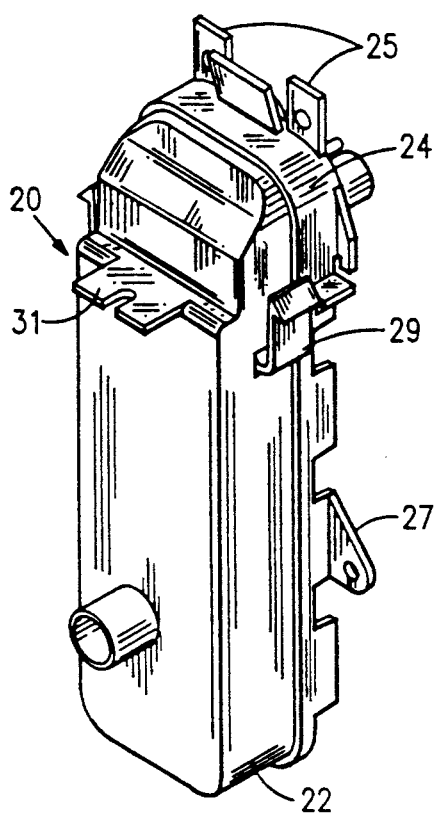
FIG. 2 is a enlarged perspective view of the condensate trap shown in FIG. 1.
Figure 3:
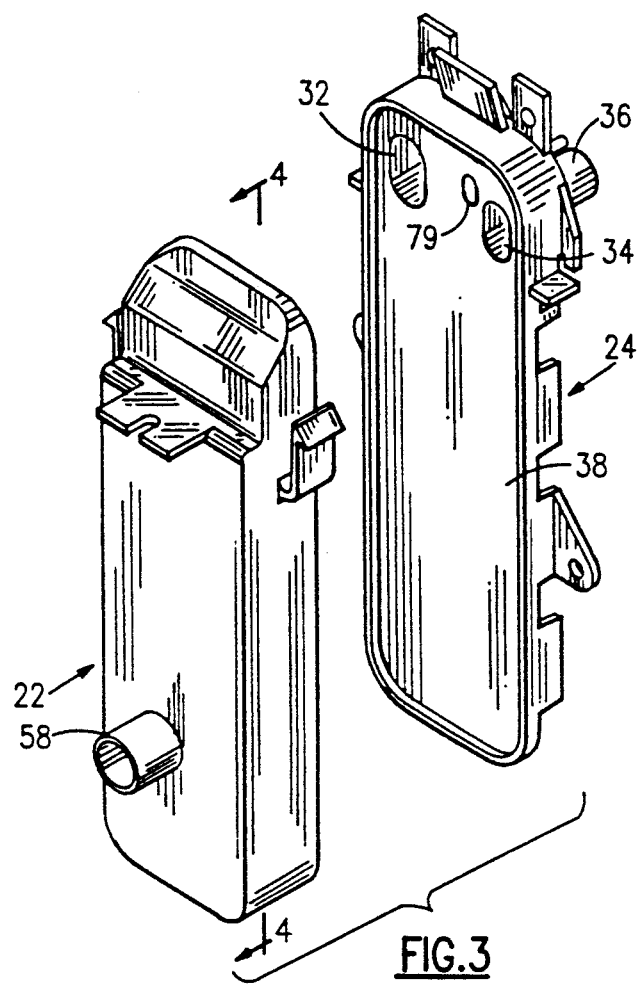
FIG. 3 is an exploded perspective view of the trap shown in FIG. 2.
Figure 4:
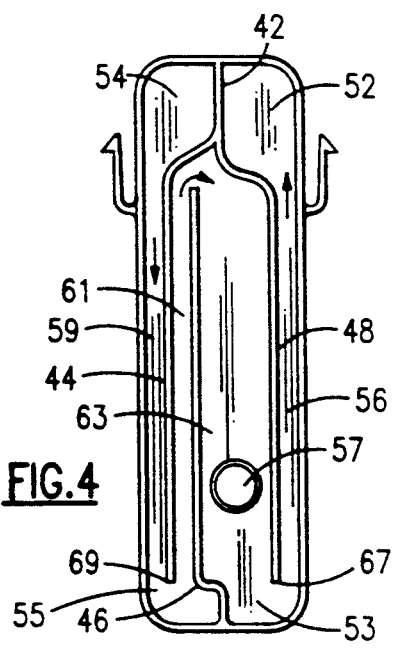
FIG. 4 is a sectional view taken on line 4—4 of FIG. 3.

Condensate trap 20 is shown in more detail in FIGS. 2-4. It is constructed of two fitted casings 22, 24 that assemble to form an enclosed chamber. A gasket (not shown) may be optionally placed therebetween to assure an adequate seal. The casings are provided with suitable mounting brackets 25, 27, 29, 31 that are arranged to accommodate a variety of furnace geometries and mounting positions.

As best shown in FIG. 3, casing 24 is provided with intake ports 32, 34 for communication with negative and positive gaseous environments respectively. Adapters, one of which is shown at reference numeral 36, receive tubes such as 74, 76 in FIG. 6 to provide a sealed communication path to their respective gaseous environments. Of course the trap 20 and tubes 74, 76 are arranged so that condensate drains generally in a downward direction through the tubes into the trap. The internal face 38 of casing 24 is flat.

Figure 4A:
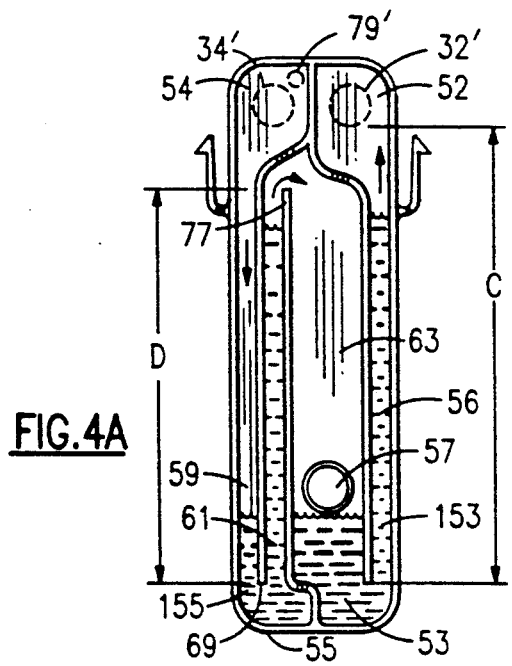
FIG. 4A is another view along line 4—4 of FIG. 3 illustrating the disposition of liquid reservoirs therein.

The opposing casing 22 is provided with raised internal septa 42, 44, 46, 48 that meet internal face 38 when the casings 22, 24 are assembled to subdivide the enclosed chamber into a system of labyrinthine ducts or passages having fluid-tight partitions therebetween. Gaskets or the like may be interposed to assure a proper seal. The lower portion of casing 24 also has an outlet port 57 served by tube adapter 58. In the upper portion of FIG. 4 relatively enlarged portions 52, 54 oppose inlet ports 32, 34 for receiving gas under negative and positive pressure respectively and condensate. As can be seen in FIG. 4A, liquid reservoir 153 is pooled in the bottom portion 53 of subchamber 63 and is displaced along duct 56 toward portion 52 in accordance with a pressure difference between the gaseous environments of subchamber 63 and portion 52. Reservoir 153 thus forms a liquid seal between the gaseous environment in portion 52 and the gaseous environment above the surface of reservoir 153 in subchamber 63. The latter environment communicates with the atmosphere via outlet port 57.

Another passage 59 leads from enlarged portion 54 downward to a lower region 55, where it recurves to continue in an upward course (shown as segment 61), finally debouching into the upper portion of subchamber 63, above the level of outlet 57. A second fluid reservoir 155 is pooled in bottom portion 55, and is displaced by the positive pressure prevailing above the gas-liquid interface in enlarged portion 54. The reservoirs 153, 155 do not commingle, except that as reservoir 155 fills, it overflows at the upper extreme of segment 61 into reservoir 153.

It will be evident that reservoir 153 is directly augmented by condensate entering from the negative pressure gaseous environment via inlet port 32, and is indirectly augmented by condensate originating from the positive pressure gaseous environment entering via inlet port 34, and filling reservoir 155 to an overflow condition. Reservoir 153 overflows through outlet 57 to a drain attached to adapter 58 (not shown). The drain is substantially at atmospheric pressure; however it could be at any pressure intermediate the pressures that are found in the high and low pressure gaseous environments.

The trap 20 is capable of withstanding a negative pressure differential indicated by dimension C in FIG. 4A, defined by the lower margin of inlet port 32, and by the lower end 67 of duct 56. In FIG. 4A the dotted circles 32', 34' correspond to the positions of circles 32, 34 respectively. The trap can withstand a positive pressure differential indicated by dimension D, defined by the upper end 77 of duct 61 and the lower end 69 of the partition separating the recurved portion of ducts 59 and 61. The larger of dimensions C and D is a constraint on the minimum vertical height of the trap 20. The vertical height of trap 20 can be given by the formula $$H = M + K$$

wherein

H is the vertical height of the trap;

M is the greater of dimensions C and D; and

K is a constant.

Figure 5:
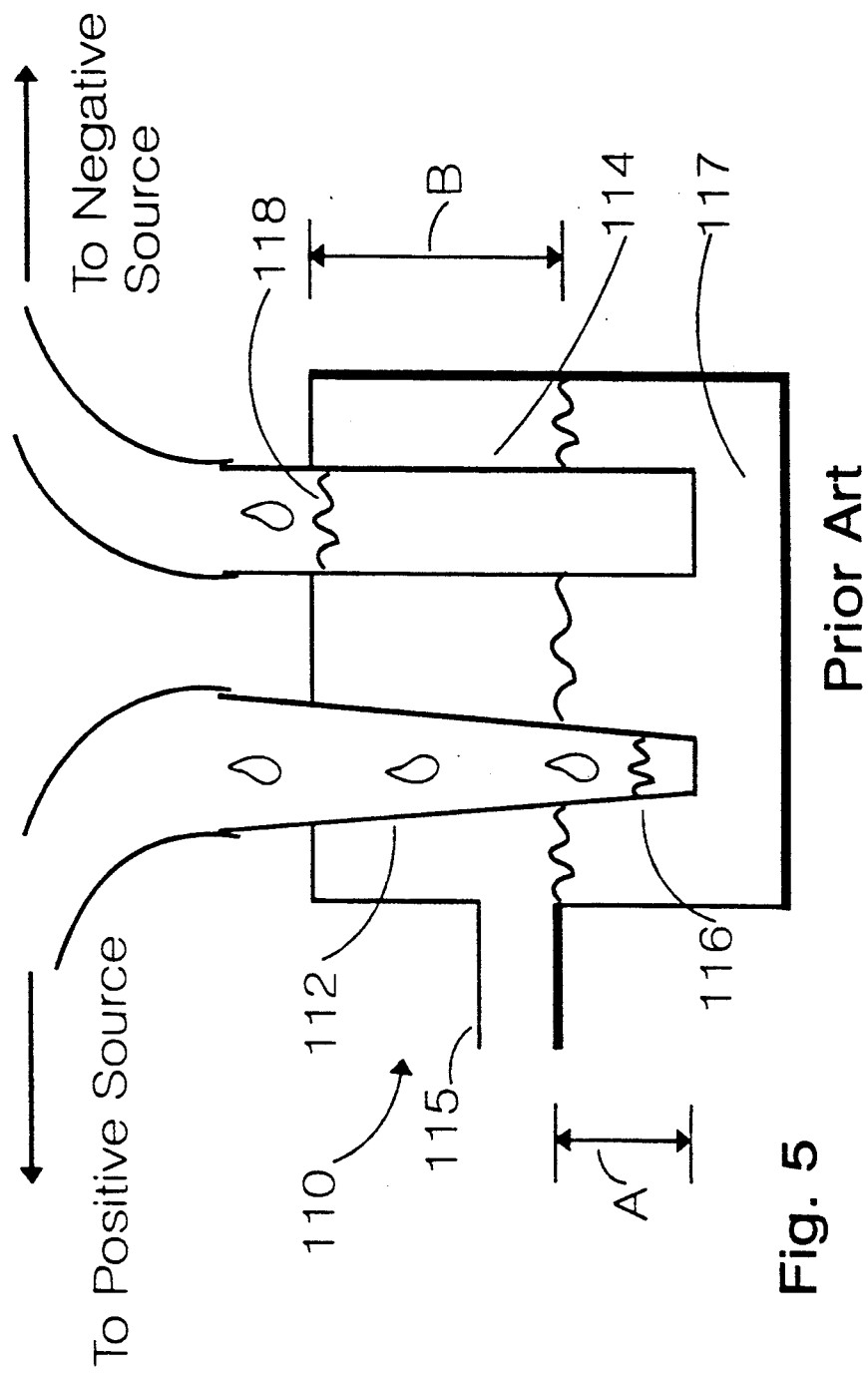
FIG. 5 is a diagrammatic view of a condensate trap in accordance with the prior art.

The constant K represents the clearances for the inlet ports, and for liquid to flow beneath the lower portions of the partitions between ducts 59, 61, and beneath the partition separating duct 56 and subchamber 63, and also incorporates the thickness of the casings 22, 24. It will be appreciated that this is a significant improvement from the prior art device of FIG. 5, wherein the minimum vertical height is the sum of dimensions A and B plus necessary clearances.

While this invention has been explained with reference to the structure disclosed herein, it is not confined to the details set forth and this application is intended to cover any modifications and changes as may come within the scope of the following claims:

What is claimed is:

1. A condensate trap for simultaneously receiving liquid condensate forming in first and second gaseous environments that are respectively under positive and negative pressure relative to a third gaseous environment, comprising:

a container having first and second inlet ports through an upper portion thereof that respectively access the first and second gaseous environments, a first fluid reservoir in a bottom portion thereof, and an outlet port through a lower portion thereof for conducting overflow of said first fluid reservoir into the third gaseous environment;

a first duct extending from said first inlet port and terminating in said interior of said container below a surface of said first liquid reservoir; whereby said first liquid reservoir establishes a first liquid seal between said first gaseous environment and said third gaseous environment;

a second duct extending from said second inlet port to an interior of said container and a reflexively directed portion to contain a second liquid reservoir therein, a portion of said second liquid reservoir being disposed above said outlet port to establish a second liquid seal between said second gaseous environment and said third gaseous environment.

2. The condensate trap according to claim 1, wherein said trap has a dimension C defined by a lower margin of said first inlet port and a lower end of said first duct, a dimension D defined by an upper margin of said second duct and a lower end of a partition in said reflexively directed portion in said second duct, and a vertical height given by the formula $$H = M + K$$

wherein

H is the vertical height of the trap;

M is the greater of dimensions C and D; and

K is a constant.

3. The condensate trap according to claim 1, wherein said container is completely enclosed except for said ports.

4. In a furnace for supplying circulating heated air to an interior comfort space and having at least one burner wherein an air flow of heated gas is moved by an inducer motor through a condensing heat exchanger and is exhausted therefrom through an exhaust vent to an outside environment, the furnace having a trap for condensate forming in the air flow, said condensate trap simultaneously receiving liquid condensate forming in first and second gaseous environments that are respectively under positive and negative pressure relative to a third gaseous environment;

wherein the improvement comprises:

said trap comprising a container having first and second inlet ports through an upper portion thereof that respectively access the first and second gaseous environments, a first fluid reservoir in a bottom portion thereof, and an outlet port through a lower portion thereof for conducting overflow of said first fluid reservoir into the third gaseous environment;

a first duct extending from said first inlet port and terminating in said interior of said container below a surface of said first liquid reservoir; whereby said first liquid reservoir establishes a first liquid seal between said first gaseous environment and said third gaseous environment;

a second duct extending from said second inlet port to an interior of said container and having a reflexively directed portion to contain a second liquid reservoir therein, a portion of said second liquid reservoir being disposed above said outlet port to establish a second liquid seal between said second gaseous environment and said third gaseous environment.

5. The furnace according to claim 4 wherein said trap has a dimension C defined by a lower margin of said first inlet port and a lower end of said first duct, a dimension D defined by an upper margin of said second duct and a lower end of a partition in said second duct, and a vertical height given by the formula $$H = M + K$$

wherein

H is the vertical height of the trap;

M is the greater of dimensions C and D; and

K is a constant.

6. The furnace according to claim 4, wherein said reflexively directed portion of said second duct is recurved.

7. The furnace according to claim 4, wherein said burner comprises at least one gas fired burner, and the air flow comprises combustion products thereof, and said output port is at atmospheric pressure.

8. The furnace according to claim 4, wherein said container is completely enclosed.

9. The furnace according to claim 4, wherein said trap further comprises a relief port disposed proximate said second inlet port for establishing limited flow communication between said first gaseous environment and said second gaseous environment.

* * * * *